Figure 1:
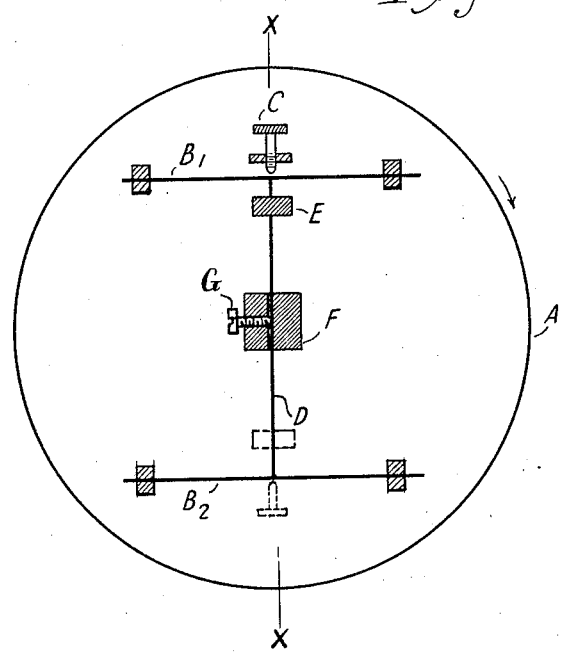

Oct. 18, 1927.  
G. VON ARCO  
SPEED GOVERNOR  
Filed May 29. 1924

1,645,556

INVENTOR  
GEORG. VON ARCO  
BY *Ira J. Adams*  
ATTORNEY

Patented Oct. 18, 1927.

1,645,556

UNITED STATES PATENT OFFICE.

GEORG VON ARCO, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY.

SPEED GOVERNOR.

Application filed May 29, 1924, Serial No. 716,532, and in Germany June 12, 1923.

My invention relates to means for automatically maintaining the speed of a rotating machine approximately constant. It has for its object to provide a governor which will be very sensitive to speed variation and keep the speed within very narrow limits as this is particularly desirable in high speed alternators such as used in radio.

Other objects will be apparent to those skilled in the art from the following specification and claims when considered in connection with the accompanying drawing.

The arrangement described in the following is known as a governor of the speed of rotation of a machine.

More particularly the invention relates to speed control systems consisting of a spring and a weight arranged on a turntable, rotating about a horizontal axis in such a way that the centrifugal force of the mass is balanced by the force of the spring for a certain critical speed of rotaton. For this speed the mechanical oscillating system is in an unstable equlibrium. The equilibrium between mass and spring is disturbed by the slightest alteration of the speed and the centrifugal force.

The force of gravity is added to and subtracted from the centrifugal force at every revolution, so that the mass carries out an oscillation of a certain amplitude at every revolution. The explanation for the effect of gravity is as follows: Since the large mass is situated in the centre of the axis of rotation of the turn table, it is apparent that the only unbalanced component of force acting on the large mass considered per se is that of gravitation. Hence, when the smaller mass is located above the larger, the effect of gravity is subtracted from the centrifugal force, and when the smaller mass lies below the larger mass the effect of gravity is obviously to be added.

Heretofore a disadvantage of this very sensitive regulating system is that the mass as well as the force of the spring must be altered, if the condition of unstable equilibrium is to be newly adjusted for another desired speed of rotation. It is very difficult in practice to alter the critical speed of rotation by adjusting the governor itself. Therefore, it is remedied by driving the governor thru variable gearing by the machine, the speed of which is to be controlled.

The purpose of the present invention is to remove this difficulty by regulating the governor itself. The principle of the invention is that the whole mass of the oscillating system is divided into two parts, one of which is subjected to the centrifugal force and the other not. Therefore this second part can be made larger and the gravity thus made more efficient, so that at every revolution of the turntable a sufficient working force is obtained even when there is a considerable friction between contacts.

Fig. 1, of the drawing is a side elevation of the device wherein the attachments to the turn table are shown in cross section.

Figure 2:
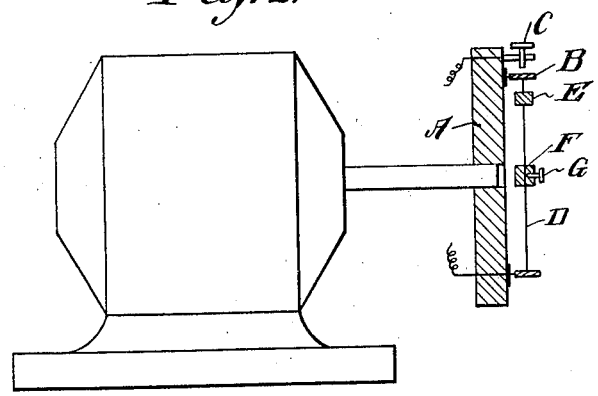

Fig. 2, is a cross section taken on the line "X—X" of Fig. 1, wherein the turn table is shown attached to the shaft of a conventional dynamo-electric machine.

Referring to the drawing $B_1$ and $B_2$, represent two spring-plates mounted on the turn table A, one of which is adapted to coact with a terminal C, also mounted on the turntable A, which in turn is mounted on an horizontal axis and operatively connected to the rotating element of the machine it is desired to govern. The two spring-plates are connected by the rod D and the weight F is arranged in the middle of the rod, substantially in the axis of revolution. G is a set screw by means of which the weight F is retained in position.

The resilience of the spring-plates $B_1$ and $B_2$ between the places where they are fixed to the turntable A and the places where the rod D is fixed, supplies the spring action necessary to resist the centrifugal force of mass E. Contact is made and broken between terminal C and spring-plate $B_1$ for different periods of time depending on the speed of rotation as will be pointed out below more in detail. The making and breaking of this contact serve to operate any well-known device for regulating the speed of the machine and may also serve to operate a device for stopping the machine if the speed becomes either abnormally high or low.

An additional weight E, smaller than F, is mounted on rod D between plate $B_1$ and weight F. Weight E exerts just enough centrifugal force when the machine is running at the desired speed to balance the force exerted by spring-plates $B_1$ and $B_2$. When the machine is running under this condition contact between plate $B_1$ and terminal C will be open and closed every revolution due to the force of gravity on mass F at the critical speed.

Thus it will easily be seen that if the machine speeds up above desired speed the centrifugal force of weight E will overcome the spring action of plates $B_1$ and $B_2$ and the contact between plate $B_1$ and terminal C will remain closed longer than when running at desired speed. On the other hand, if the machine speed decreases from desired speed, the spring action of spring-plates $B_1$ and $B_2$ will overcome the centrifugal force of weight E and the contact between plate $B_1$ and terminal C will remain open longer than when running at desired speed.

It will easily be seen by those skilled in the art that change of relative periods of open and closed position of the contacts can control the speed of the machine in conjunction with any of the well-known devices in the art.

By means of mass F a change in speed of the device is now possible by adjusting the governor itself. For this purpose the weight F is slightly removed from the middle position upwards or downwards on the rod D by means of the set screw G. If the weight is moved towards E the contact is attained at a lower speed and if the weight is moved in the opposite direction at a higher speed.

Having disclosed the principle of my invention, various modifications will be apparent to those skilled in the art. My invention, therefore, is not limited to the specific disclosure, but only by the scope of the following claims:—

1. In a device of the character described, a member rotatable about a horizontal axis, a radial member mounted on the rotatable member, a plurality of unequal masses on the radial member and contact means controlled by the movement of the masses.

2. In a device of the character described, a rotatable member, an oscillating mechanical system resiliently mounted on the rotatable member, said oscillating system comprising a pair of spring members, a radial member mounted therebetween and a plurality of unequal masses mounted on said radial member, a contact element and means to control the amount of movement of the oscillation system relative to the contact element.

3. In a device of the character described, a rotatable member, a plurality of oscillating members resiliently mounted on the rotatable member for movement in a radial direction at every revolution of the rotatable member and means whereby the force of gravity is added to and subtracted from the centrifugal force acting on a mass mounted on one of the oscillating members whereby the amount of movement of the oscillating members is controlled.

4. In a device of the character described, a rotatable member, a radial member, a comparatively large mass slidably mounted on the radial member, a comparatively small mass mounted at the end of the radial member, resilient members regulating the movement of the radial member, a contact element and means whereby the force of gravity controls the degree of movement between the masses and the contact element.

5. In a device of the character described, a member rotatable about a horizontal axis, an oscillating system fastened thereon comprising resilient means mounted on said rotatable member, a mass located substantially in the line of said axis and supported from said resilient means, a second smaller mass also mounted on said resilient means and disposed at a distance from said axis and contact means adapted to be actuated by the oscillation of said system.

6. In a device of the character described, a rotatable member, a radial member, a comparatively large mass mounted on the radial member, screw threaded means permitting slidable adjustment of the said large mass on the radial member, a comparatively small mass fixedly mounted at the end of the radial member, resilient members at each end of the radial member supporting said radial member and permitting oscillation of said radial member, a contact element and means whereby the force of gravity may be introduced to effect the amount of oscillation between the radial member and the contact element.

7. In a device of the character described, a rotatable member, a radial member mounted thereon and a plurality of unequal masses mounted on said radial member.

8. In a device of the character described, a rotatable member, a radial member mounted thereon and a plurality of unequal masses mounted on said radial member, one of said masses being adjustable along said radial member.

9. In a device of the character described, a rotatable member, a pair of parallel spring members mounted thereon, and a radial member mounted between and supported by the spring members.

10. In a device of the character described, a rotatable member, a pair of parallel spring members mounted thereon and a radial member mounted between and supported by the spring members at substantially right angles thereto.

11. In a device of the character described, a rotatable member, a pair of parallel spring members mounted thereon and a radial member mounted between and supported by the spring members at substantially right angles thereto, and a plurality of masses attached to the radial member.

12. In a device of the character described, a rotatable member, a pair of parallel spring members mounted thereon and a radial member mounted between and supported by the spring members at substantially right angles thereto, and a plurality of masses attached to the radial member, one of said masses being adjustable along the radial member.

13. In a device of the character described, a rotatable member, a pair of parallel spring members mounted thereon and a radial member mounted between and supported by the spring members at substantially right angles thereto, and a plurality of unequal masses attached to the radial member, one of said masses being adjustable along the radial member, one of said spring members acting as a contact member and a second contact member spaced therefrom attached to the rotatable member.

14. In a device of the character described, a rotatable element, a pair of unequal masses resiliently mounted thereon, one of said masses affected during rotation substantially by gravity, the other mass affected substantially during rotation by centrifugal force, both of the masses so arranged that for each revolution of the rotatable element, the force of gravity of one mass is added to or subtracted from the centrifugal force acting on the other mass.

GEORG VON ARCO.